(12) United States Patent
Boshev et al.

(10) Patent No.: US 10,261,872 B2
(45) Date of Patent: Apr. 16, 2019

(54) MULTILEVEL DISASTER RECOVERY

(71) Applicant: SAP SE, Walldorf (DE)

(72) Inventors: Stoyan Boshev, Sofia (BG); Petio Petev, Sofia (BG); Thomas Walter, Althengstett (DE); Bogdan Vatkov, Sofia (BG); Hristo Dobtchev, Sofia (BG); Borislav Arnaudov, Sofia (BG)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 15/610,609

(22) Filed: May 31, 2017

(65) Prior Publication Data

US 2018/0349238 A1    Dec. 6, 2018

(51) Int. Cl.
| | | |
|---|---|---|
| *G06F 11/14* | (2006.01) | |
| *G06F 11/16* | (2006.01) | |
| *G06F 11/20* | (2006.01) | |
| *G06F 16/27* | (2019.01) | |
| *H04L 29/08* | (2006.01) | |

(52) U.S. Cl.
CPC ...... *G06F 11/2023* (2013.01); *G06F 11/1658* (2013.01); *G06F 16/273* (2019.01); *H04L 67/322* (2013.01); *G06F 11/1446* (2013.01)

(58) Field of Classification Search
CPC ............. G06F 11/1446; G06F 11/1458; G06F 11/1464; G06F 11/1658; G06F 11/1662; G06F 11/2023; G06F 2201/80; G06F 2201/84; G06F 2201/85; G06F 16/27; G06F 16/273; G06F 16/275; H04L 67/322
See application file for complete search history.

(56) References Cited

U.S. PATENT DOCUMENTS

| | | | | |
|---|---|---|---|---|
| 7,124,320 | B1* | 10/2006 | Wipfel | G06F 11/203 714/13 |
| 7,320,088 | B1* | 1/2008 | Gawali | G06F 11/1662 709/219 |
| 9,274,903 | B1* | 3/2016 | Garlapati | G06F 11/2002 |
| 2013/0132946 | A1* | 5/2013 | Ma | G06F 11/006 718/1 |
| 2014/0380087 | A1* | 12/2014 | Jamjoom | G06F 11/2002 714/4.11 |
| 2016/0306719 | A1* | 10/2016 | Laicher | G06F 11/203 |
| 2017/0168903 | A1* | 6/2017 | Dornemann | G06F 9/45558 |

* cited by examiner

*Primary Examiner* — Gabriel Chu
(74) *Attorney, Agent, or Firm* — Buckley, Maschoff & Talwalkar LLC

(57) ABSTRACT

Account data comprising metadata for primary application instances running at a primary active cloud environment instance (ACEI) is stored. Application data associated with the primary application instances is stored at primary databases (DBs). The account and application data are transferred to secondary DBs at a secondary ACEI. The secondary ACEI may be a backup instance to substitute services provided by the primary ACEI in case of unavailability. For example, the location where the primary ACEI is hosted may be affected by a disaster. To failover a primary data center hosting the primary ACEI, a database takeover to the secondary DBs is performed. The secondary ACEI is configured correspondingly to the primary ACEI based on the transferred account data. Secondary application instances corresponding to the primary application instances are started at the secondary ACEI. Requests directed to the primary application instances are redirected to the secondary application instances.

20 Claims, 11 Drawing Sheets

MULTILEVEL DISASTER RECOVERY

BACKGROUND

Data centers may host applications, data, and services. For example, cloud platforms may run in the data centers and consume provided resources to run applications and services, and/or to store data. Cloud computing services running on the cloud platforms may include, among others, virtual server instances, virtual storage, application program interfaces (APIs), development tools.

Continuous provisioning of the cloud computing services is essential for the customers of the cloud platforms. Catastrophic or disruptive events may enforce an unplanned down time on the cloud computing services and customer applications by causing significant damage to or destroying the data centers that host the cloud platforms. Such events are commonly referred to as disasters. Disaster recovery (DR) refers to preparing DR plans that describe DR procedures with an aim to minimize negative effects caused by the disasters. DR allows for recovering the data and resuming the applications and the cloud computing services following the disasters. Normally, the prepared DR plans are followed to restore the operation of the cloud platforms in remote locations within a reasonable timeframe.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
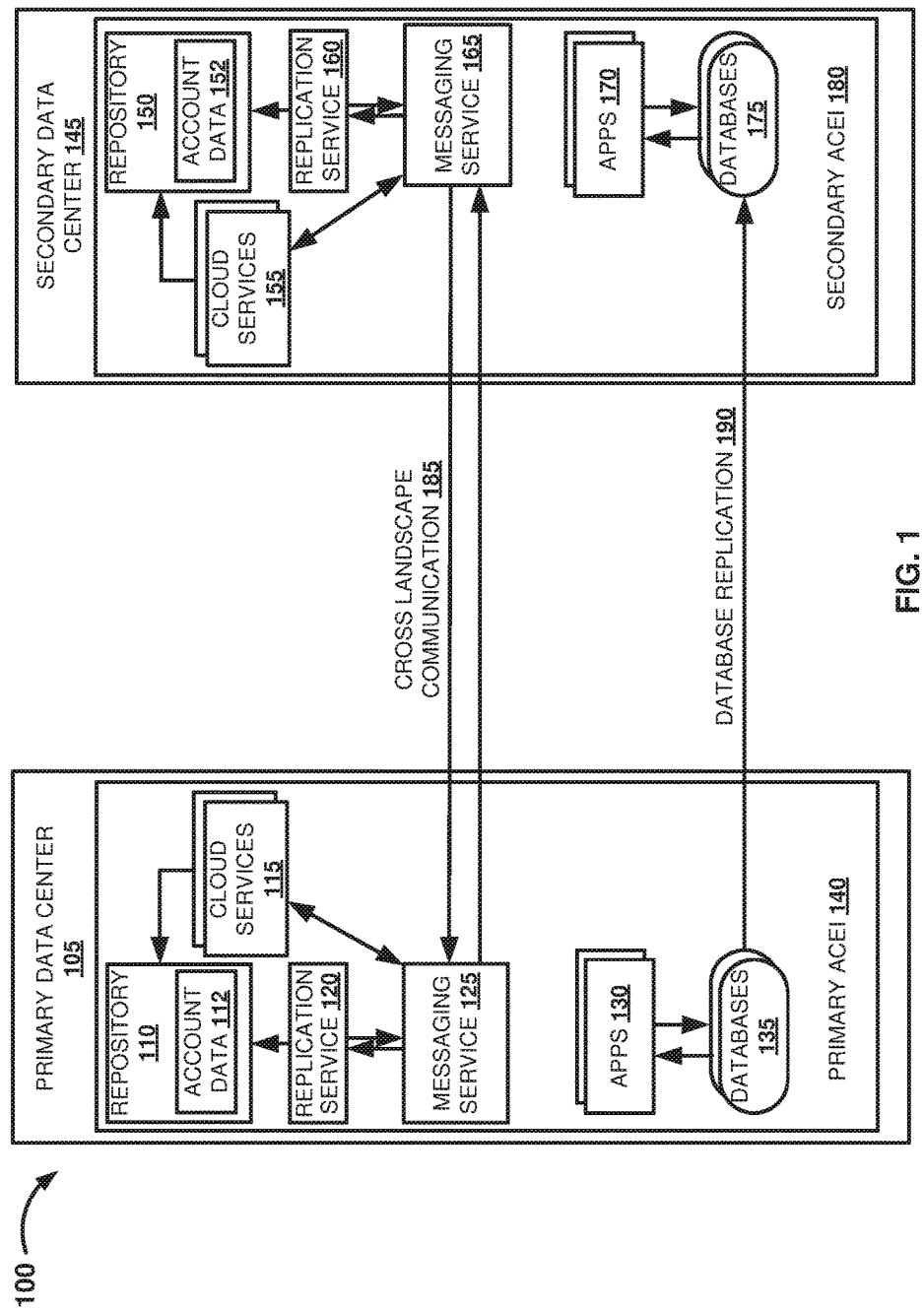
FIG. 1 is a block diagram illustrating a system to replicate data from a primary data center to a secondary data center, according to one embodiment.

Embodiments of techniques for multilevel disaster recovery are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A cloud environment can be viewed as containing both an infrastructure layer and an abstraction layer. The infrastructure layer may be associated with hardware resources to support cloud services being provided by the cloud environment. The infrastructure layer may be hosted in a dedicated facility such as a data center. The abstraction layer may include a cloud platform deployed across the infrastructure layer, which provides functionality for designing and developing of cloud applications. For example, the cloud platform may provide application runtime, user interface (UI) development toolkits, internal configurations, cloud services. The functionality provided by the cloud platform can be utilized by customers of the cloud platform to develop and/or deploy software applications as cloud applications. The cloud applications may consume the provided cloud services by the cloud platform and/or other services implemented or integrated in the applications.

In case of a disaster at a location where a data center hosting a cloud environment is positioned, data stored at the data center may be lost and services provided, by the data center to the cloud environment may be terminated. Therefore, an established disaster recovery (DR) plan may be followed to recover the data and applications of the customers of the cloud environment, which was affected by the disaster. In one embodiment, the cloud environment related to the affected data center may be referred to as a "primary cloud environment" and the affected data center—"primary data center". The primary data center may be restored at a backup data center (also referred to as "secondary data center") hosting a secondary cloud environment, when a disaster affected the primary data center. For the restoration to happen, the backup data center may be regularly updated with backed up data from the primary data center before the disaster has happened. The backup data center may be remotely located from the main data center. The cloud environment may provide cloud services that may be consumed by applications, which run in the cloud environment. Established DR plans may provide fast recovery of the cloud, services and applications running in the cloud environment in case of a disaster at a location associated with the main data center.

However, even with the DR plans in place, restoring data and applications upon disaster requires tremendous effort and an interval of time, when the applications and the cloud services are unavailable. Such periods of time (downtime) may not be acceptable for some of the customers of the cloud environment. For example, customers of the cloud environment that run mission-critical applications may require shorter downtime and a smaller volume of lost data compared to other customers of the cloud environment. At least some of the technologies described herein address these problems by defining different DR levels for the customers of the cloud environment, by providing a DR service for configuration, monitoring and management of DR related tasks, and by restoring data of customers associated with the different levels of DR in different cloud environments that run in one or more backup data centers. For example, a standard DR level and a premium DR level ensuring different downtimes and data loss volumes may be defined. The DR levels may be managed by the DR service. The DR service may be a part of the cloud services provided to the customers of the cloud environment. The DR levels may require a subscription or may be available as out-of-the-box options in the DR service. For example, data of customers associated with the premium DR level may be replicated on defined intervals to an active cloud environment in the backup data center. Since the active cloud environment in the backup data center may run similar applications and cloud services like the primary cloud environment, recovering the replicated data in the running applications and cloud services may be faster, when compared to recovering data of customers associated with the standard DR level from a backup copy of the data in a standby cloud environment. Applications must be deployed and cloud services must be started in the standby cloud environment before restoring the data from the backup copy that is created on longer intervals in the primary cloud environment and transferred to a backup data center hosting the standby cloud environment.

FIG. 1 illustrates a system 100 including a primary data center 105 and a secondary data center 145, according to one embodiment. The primary data center 105 hosts primary active cloud environment instance (ACEI) 140. The primary ACEI 140 provides infrastructure and development tools that may be used for designing, development, deployment, management and maintenance of cloud applications running in the primary ACEI 140. The primary ACEI 140 is an active cloud environment. The primary ACEI 140 serves requests to cloud applications running in the primary ACEI 140. The primary ACEI 140 may be in communication to load data from internal and external data storages such as repositories and/or databases. In one embodiment, the primary ACEI 140 includes one or more cloud services 115 and one or more primary applications' instances (APPS) 130. The cloud services 115 may include one or more cloud services provided by the primary ACEI 140, as well as one or more instances of a cloud service from the one or more cloud services. One or more instances of applications from APPS 130 may access the one or more instances of the cloud service from the one or more cloud services 115 to utilize an out-of-the-box functionality provided by the cloud service. The cloud services 115 are associated with repository 110 and may read and write data in the repository 110. The cloud services 115 persist data associated with one or more accounts of customers of the primary ACEI 140 and other data associated with the provided functionality implemented at the cloud services. For example, the repository 110 may store metadata for applications that consume the functionality provided by the cloud services 115, documents, configurations, etc.

In one embodiment, the functionality provided by the primary ACEI 140 can be utilized for deployment and/or running of software applications (e.g., the APPS 130) on the primary ACEI 140. A number of the APPS 130 may be associated with a corresponding number of databases 135, where application data may be persisted. A primary application instance from APPS 130 is associated with a corresponding database instance of a database from the databases 135. The APPS 130 persist application data in the databases 135. The databases 135 are operational databases set to an online operational state. In such manner, the APPS 130 may read and write data to corresponding application databases from the databases 135.

In one embodiment, the secondary data center 145 hosts secondary ACEI 180. The secondary ACEI 180 is also an active cloud environment. The cloud services 155 may read and write data in repository 150. The system 100 is configured to replicate data from the primary ACEI 140 to the secondary ACEI 180. In one embodiment, the secondary data center 145 is a backup data center for the primary data center 105.

It should be appreciated, however, that some embodiments may include two primary data centers (e.g., the data center 105 and the data center 145) configured to act as secondary data centers to each other. Having two data centers acting as backup centers for each other may eliminate the necessity of a third and fourth data center, respectively, to act as their backup data centers. Providing DR backup options in such manner, may reduce total cost of ownership (TCO). The secondary data center 145 is remotely located from the primary data center 105 to optimize positioning of data centers with respect to risks associated with disasters. The secondary ACEI 180 represents a backup active cloud environment instance to the primary ACEI 140, which may substitute the provided services by the primary ACEI in case of a disaster.

In one embodiment, the secondary ACEI 180 may include data copies built from the data persisted in the repository 110 by the cloud services 115 and the application data persisted in the databases 135 by the APPS 130 of the primary ACEI 140. The persisted data associated with the one or more accounts may be stored at repository 110 of the primary ACEI 140 and may be replicated to the repository 150 at the secondary data center 145. Thus, the data persisted by the cloud services 115 is accessible to corresponding services from the cloud services 155.

In one embodiment, application data persisted by the APPS 130 in the databases 135 is replicated to the databases 175. The databases 175 of the secondary ACEI 180 become operational (e.g., secondary applications instances APPS 170 start to read and write data to the databases 175) when a disaster interrupts the operation of the primary ACEI 140. The APPS 170 may represent copies of the APPS 130. The APPS 170 are associated with the databases 175 and may access the application data in the databases 175 to restore the operation of the APPS 130 in the secondary ACEI 180 upon the disaster. A secondary application instance from APPS 170 is associated with a corresponding database instance of a database from the databases 175.

It should be appreciated, however, that when the primary data center 105 and the secondary data center 145 are configured to act as backup data centers to each other, the secondary ACEI 180 may include one or more operational databases (not illustrated) in addition to the databases 175. The one or more operational databases may be associated with one or more main applications' instances (not illustrated) that may run in the secondary ACEI 180 and may persist application data in the one or more operational databases. The application data persisted in the one or more operational databases of the secondary ACEI 180 may be replicated to one or more non-operational databases (not illustrated) of the primary ACEI 140. In such a configuration, one or more backup applications' instances (not illustrated) may run in the primary ACEI 140 and may access the application data persisted by the one or more main applications' instances of the secondary ACEI 180 to restore the operation of the one or more main applications' instances of the secondary ACEI 180 in the primary ACEI 140 upon a disaster.

In one embodiment, the primary ACEI 140 provides one or more cloud services 115 and the secondary ACEI 180 provides one or more cloud, services 155. In one embodiment, the secondary ACEI 180 includes one or more cloud services 155 and one or more secondary applications' instances (APPS) 170. The cloud services 155 may include one or more cloud services provided by the secondary ACEI 180, as well as one or more instances of a cloud service from the one or more cloud services. One or more instances of applications from APPS 170 may access the one or more instances of the cloud service from the one or more cloud services 155 to utilize an out-of-the-box functionality provided by the cloud service. In one embodiment, cloud services provided by cloud environments may provide functionality that can be integrated into the functionality of customer applications hosted by the cloud environments. Cloud services may provide ready-to-use basic functionalities for customer developed applications, enabling customers to focus on developing custom application functionality. Examples of cloud services include connectivity service, persistence service, identity service, feedback service, document service, etc.

An account defined for a cloud offering may be defined as a hosted environment within the primary ACEI 140. For a defined account, one or more applications (e.g. one or more of APPS 130) may be deployed at the designated hosted environment and may be associated with the cloud services 115 provided by the primary ACEI 140. The account represents a scope of functionality purchased by a customer of a cloud offering including cloud environment instances, such as the primary ACEI 140. When an account is created for a cloud environment offering, one or more instances of cloud environments may be associated with the account. In one embodiment, the customer associated with the account associated with the primary ACEI 140 may develop, run, and manage customer's applications in the primary ACEI 140. The development, deployment, hosting, managing, etc. of customer's application at the primary ACEI 140 may be performed through interactions with the primary ACEI 140 performed by a user and or an administrator associated with the defined account.

In one embodiment, an account defined for a cloud environment offering including the primary ACEI 140 may be coupled with a data center, such as the primary data center 105. Thus, the applications associated with the account may be deployed and run in the primary ACEI 140 that is hosted at the data center 105.

In one embodiment, the data persisted in the repository 110 includes account data 112. Examples of account data include, but are not limited to, account name, applications associated with the account, application logs, applications' configuration, passwords, permissions, and roles of one or more users associated with the customer account. Further, the account data 112 includes metadata corresponding to the persisted data. For example, the account data 112 may include metadata describing a type of the account, applications' description (e.g., application owner, memory consumption, root directory, etc.), credentials, date and time of collection of the application logs, name of a user last modified a configuration of an application at the primary ACEI 140, passwords' length, and so on. The account data 112 persisted in the repository 110 represents a bundle of account information that is generated in the primary ACEI 140 and includes details for services associated with the customer account from the cloud services 115 and applications' instances associated with the customer account from the APPS 130.

In one embodiment, the repository 110 is associated with an export and import functionality via replication service 120. The replication service 120 is configured to export the account data 112 from the repository 110 to enable replication of the account data 112 to the secondary ACEI 180, e.g. at regular time intervals. For example, the replication service 120 may be configured to export the account data 112 associated with account "xyz" from the repository 110, on a fixed interval (e.g. on "n" minutes). In one embodiment, the replication service 120 exports the account data 112 when the account data 112 has been changed. The replication service 120 sends a polling request to the repository 110 to check whether the account data 112 has been changed since the latest call to determine a change. In one embodiment, when a new user is defined to be associated with the account "xyz", then the account data 112 is changed. For example, data for the one or more users associated with the account will be changed, along with passwords, permissions, applications the new user is associated with, and the corresponding metadata. Thus, upon receiving the polling request, the repository 110 determines that the account data 112 has been changed and, therefore, exports the account data 112 and sends the account data to the replication service 120. For example, the repository 110 may check last modification of the account data 112 by a timestamp. The timestamp, together with other log data associated with the account "xyz", may be stored in a history log table in the repository 110. Further, the replication service 120 may be configured to filter the account data 112 based on criteria. For example, portions of the account data 112 that are specific for the primary ACEI 140 (e.g., destinations and database hosts) can be excluded from the exported account data 112 by setting an appropriate filter. Various techniques for filtering data may be employed to filter the account data 112. For example, a filter representing textual metadata that instructs what actions may be performed and what actions may not be performed on specific parts of the account data 112 may be parsed by the replication service 120 to filter the account data 112 in accordance with the instructions.

In one embodiment, the primary ACEI 140 and the secondary ACEI 180 are clustered together. Communication between the primary ACEI 140 and the secondary 180 may be provided through the messaging service 125 and messaging service 165. The messaging service 125 and the messaging service 165 may be dedicated services for communication between cluster elements, such as the primary ACEI 140 and secondary ACEI 180. The messaging services are aware of the active cluster elements. For example, the messaging service 125 is aware of the secondary ACEI 180 and the messaging service 165 is aware of the primary ACEI 140. The messaging services 125 and 165 may send notifications for events that arise in the cluster of the primary ACEI 140 and the secondary ACEI 180 to the corresponding cluster elements (e.g., when the primary ACEI 140 is lost through a disaster or shutdown, the secondary ACEI 180 may be notified). The messaging service 125 may be associated with the messaging service 165 to provide a communication channel between cloud services 115 and cloud services 155. Communication through messaging services may prevent performance problems that may occur when a large number of services communicate directly with each other in a cross landscape scenario.

In one embodiment, the messaging service 125 of the primary ACEI 140 and messaging service 165 of the secondary ACEI 180 exchange account data 112 and 152 associated with the cloud services 115 and the cloud services 155 via messages. The replication service 120 encrypts the exported account data 112 in a message. The replication service 120 sends the message to messaging service 125 for processing. The messaging service 125 sends the message to the messaging service 165 of the secondary ACEI 180. The messaging service 125 is connected to messaging service 165 of the secondary ACEI 180 through a communication channel providing cross landscape communication 185. Cross landscape communication 185 represents a direct link between the messaging service 125 of the primary ACEI 140 in the primary data center 105 and the messaging service 165 of the secondary ACEI 180 in the secondary data center 145.

In one embodiment, the replication service 160 of the secondary ACEI 180 is configured to poll the messaging service 165 for messages. Messages received at the messaging service 165 are read and decrypted by replication service 160. In one embodiment, the replication service 160 extracts the account data 112 (that is sent via the cross landscape communication 185) from the message and imports the account data 112 to the repository 150 as account data 152. Optionally, messages read by the replication service 160 are deleted from the messaging service 165 upon reading.

In one embodiment, the account data 112 transported from the repository 110 to the repository 150 is associated with an account that is subscribed to premium disaster recovery (DR). The subscription may be defined by configuring a parameter in the metadata of the account. The metadata of the account is part of the account data 112. For example, an "account type" parameter in the metadata of the account may be set to "premiumDR" to define the premium DR subscription. Further, the APPS 130 are configured for the premium DR. For example, the premium DR may be enabled for the primary application instances APPS 130 by one or more users associated with the account. When the premium DR is enabled, replication of the databases 135 that correspond to the primary application instances APPS 130 is triggered.

In one embodiment, the messaging service 125 receives messages from the cloud services 115 in addition to receiving messages from the replication service 120.

The cloud services 115 may include one or more cloud services that persist data in the repository 110, as well as one or more cloud services that persist data in a corresponding persistent storage (not illustrated). The cloud services 115 may store account data to be shared with other cloud services in the repository 110. Further, cloud services may store various data that in the repository 110. The cloud services 115 may utilize different combinations for persisting data. For example, the cloud services 115 may store data in the repository 110, store data in the repository 110 and in the corresponding persistent storage (e.g., database, file system, network storage volume, etc.), store data in the corresponding persistent storage, store data in one or more cloud services (e.g., document service, configuration service, etc.), store data in the repository 110, the corresponding persistent storage and in the one or more cloud services, or not store data. When a cloud service from the cloud services 115 persists data in the corresponding persistent storage, the cloud service may send a direct message including the data to the messaging service 125. Thus, when the message is sent from the messaging service 125 through the messaging service 165 to a corresponding cloud service from the cloud services 155, the data of the cloud service is replicated from the primary ACEI 140 to the secondary ACEI 180.

In one embodiment, the databases 135 of the primary ACEI 140 are replicated to databases 175 of the secondary ACEI 180 through database replication 190. For example, the database replication 190 can capture database transactions in the databases 135 and replicate the database transactions to the databases 175. When database replication is enabled for a primary application instance from the APPS 130, application data persisted by the primary application instance in a corresponding database of the databases 135 is automatically replicated in the databases 175.

Figure 2:
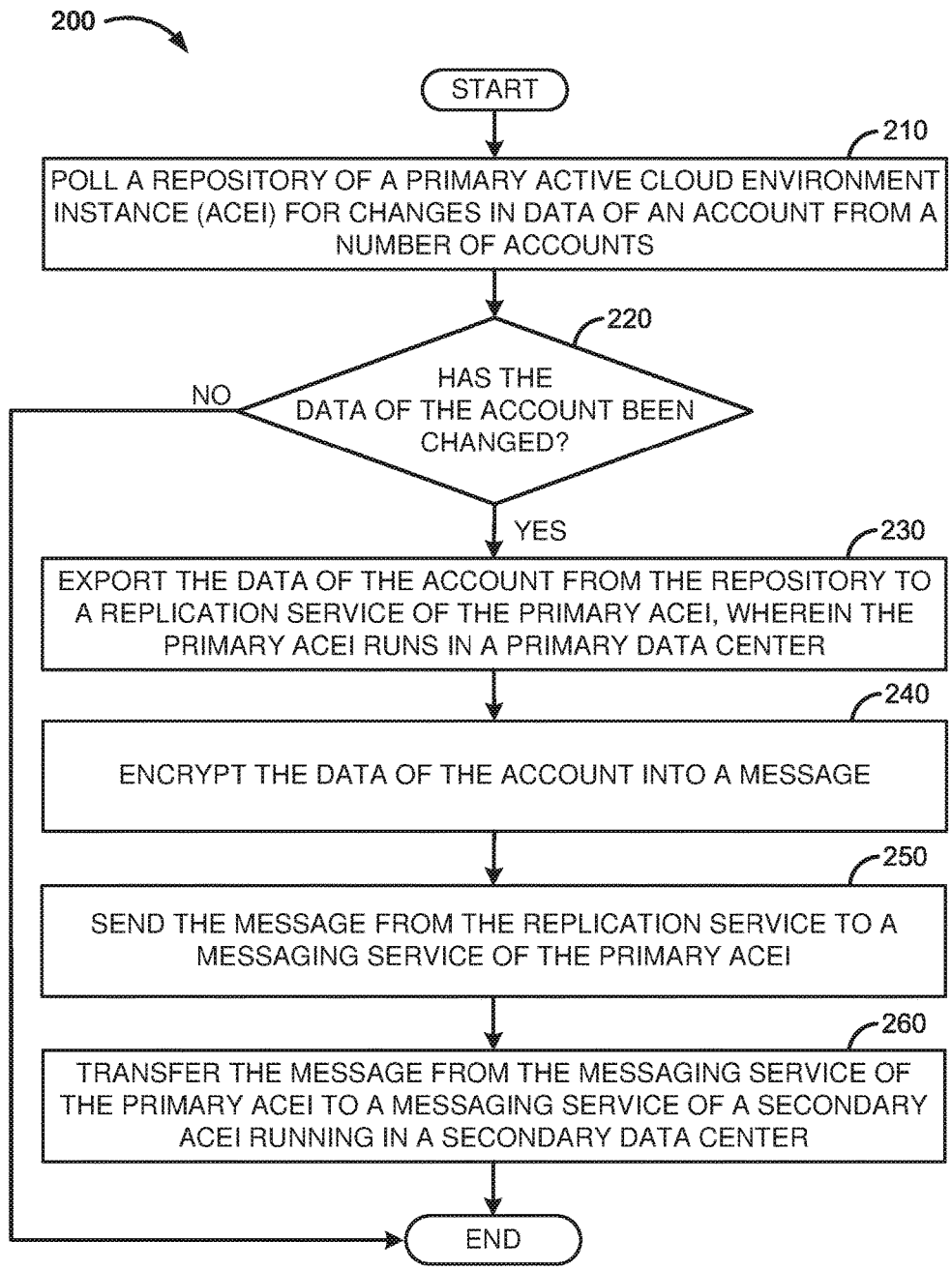
FIG. 2 is a flow diagram illustrating a process to export account data from a repository of a primary active cloud environment instance (ACEI), according to one embodiment.

FIG. 2 illustrates process 200 to export account data from a repository of a primary ACEI to be sent to a secondary ACEI serving as a backup cloud environment, according to one embodiment. The primary ACEI may be such as the primary ACEI 140 described above with reference to FIG. 1. At 210, a repository of the primary ACEI (e.g., the repository 110 of the primary ACEI 140) is polled for changes in the account data. The account data may include name of the account, one or more users associated with the account, configuration details for one or more application instances associated with the account, passwords, permissions, metadata for the account data, etc. In one embodiment, a replication service of the primary ACEI (e.g., the replication service 120) may poll the repository for changes in the account data at regular time intervals.

At 220, it is checked whether the account data has been changed since the last polling request. Examples of changes in the account data include, but are not limited to, associating a new user with the account, starting/stopping an application instance associated with the account, changing configuration of the application instances, collecting logs and traces for the configuration instances, changing users' passwords, permissions, roles, changes in the metadata (e.g., adding a parameter that defines the account as premium disaster recovery (DR) account in the metadata of the account). If the account data has not changed, process 200 is discontinued, and no data replication is performed.

When it is determined that the account data has been changed, at 230, the account data is exported from the repository. A replication service may be configured to export the account data from the repository. At 240, the exported account data is encrypted in a message. At 250, the encrypted message is sent from the replication service to a messaging service of the primary ACEI.

In one embodiment, a direct link is established between the messaging service of the primary ACEI and a messaging service of the secondary ACEI. The secondary ACEI may represent a backup ACEI to the primary ACEI in case of a disaster. The messaging service of the primary ACEI and the messaging service of the secondary ACEI exchange messages including data of accounts via the direct link. The primary ACEI runs in a primary data center and the secondary ACEI runs in a secondary data center. To enable data recovery in case of disaster at the primary data center, the data of the accounts is replicated from the primary ACEI to the secondary ACEI. At 260, the message is transferred from the messaging service of the primary ACEI to the messaging service of the secondary ACEI. In one embodiment, process 200 represents a portion of a process to replicate the account data of the repository of the primary ACEI to the repository of the secondary ACEI.

Figure 3:
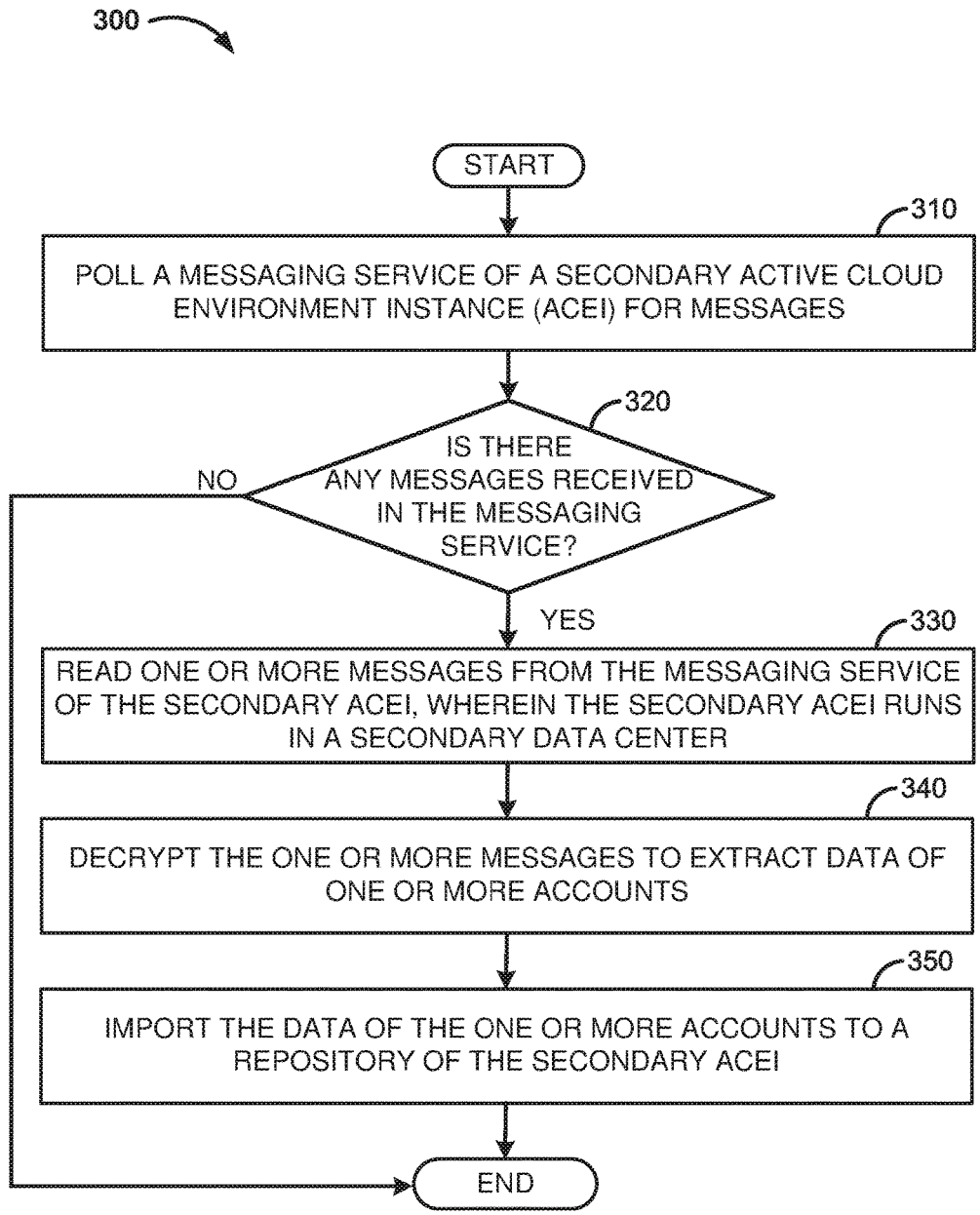
FIG. 3 is a flow diagram illustrating a process to import account data in a repository of a secondary ACEI, according to one embodiment.

FIG. 3 illustrates a process 300 to import account data in a repository of a secondary ACEI, according to one embodiment. The secondary ACEI may represent a backup ACEI to a primary ACEI in case of a disaster. At 310, a request for polling messages is sent to a messaging service of the secondary ACEI, which include the account data to be imported. For example, replication service 160 may send the request to messaging service 165 of secondary ACEI 180 described above with reference to FIG. 1. The messaging service of the secondary ACEI receives messages from a messaging service of the primary ACEI. At 320, it is checked whether there are messages in the messaging service of the secondary ACEI that are not yet read by the replication service. When there are no unread messages in the messaging service, process 300 is discontinued.

At 330, when there are one or more unread messages in the messaging service to be polled, the one or more messages are read by the replication service of the secondary ACEI. In one embodiment, messages that have been read are deleted from the messaging service. At 340, the one or more messages are decrypted to extract the account data. At 350, the account data is imported to the repository of the secondary ACEI. A data copy of the account data of the primary ACEI is created in the secondary ACEI to enable transitioning of operation of the primary ACEI to the secondary ACEI, when the primary ACEI becomes unavailable due to a disaster at a location where a data center hosting the primary ACEI is positioned. The replication of the account data is relevant for the operation of the secondary ACEI in the role of the primary ACEI due to the account configuration details included in the account data, which allow for configuration of cloud instance to correspond to properties defined for the primary ACEI. In one embodiment, process 300 represents a portion of a process to replicate the account data of a repository of the primary ACEI to the repository of the secondary ACEI.

Figure 4:
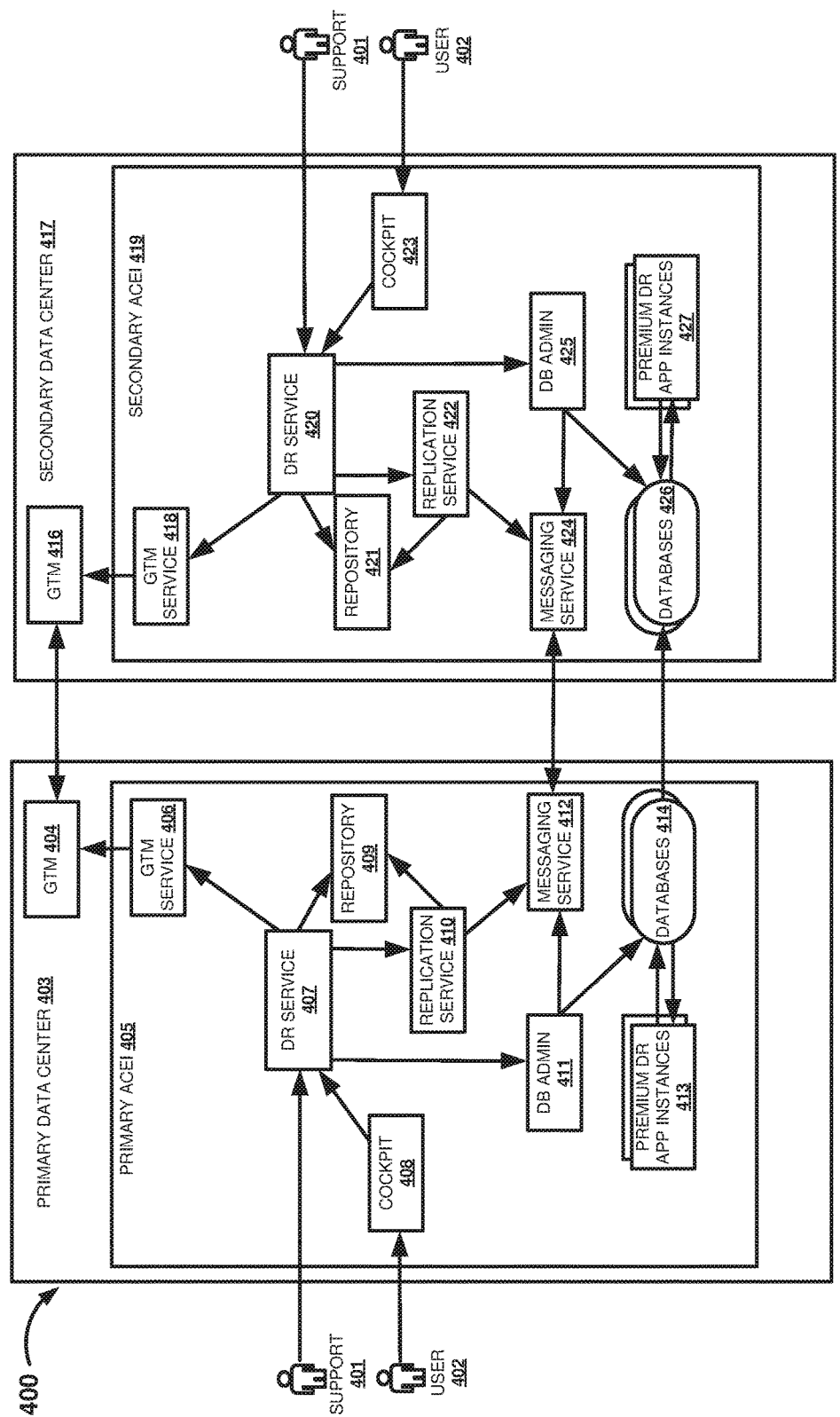
FIG. 4 is a block diagram illustrating an exemplary system to configure and manage replication of account data and application data, according to one embodiment.

FIG. 4 illustrates system architecture 400 to configure and manage replication of account data and application data from a primary data center 403 to a secondary data center 417, according to one embodiment. The primary data center 403 hosts primary ACEI 405. In one embodiment, the primary ACEI 405 includes elements similar to the primary ACEI 140 described above with reference to FIG. 1. The primary ACEI 405 provides one or more cloud services (e.g., cloud services 115 illustrated on FIG. 1) that deliver ready-to-use and easy-to-integrate functionality for consumption by customer developed applications running in the primary ACEI 405. Examples of cloud services include, but are not limited to, connectivity service, persistence service, and identity service.

In one embodiment, repository 409 of the primary ACEI 405 stores account data associated with one or more accounts of customers of the primary ACEI 405. The account data is persisted in the repository 409 by the one or more cloud services provided by the primary ACEI 405, A customer associated with an account may deploy applications at the primary ACEI 405 and consume the one or more cloud services. A user, such as user 402, may be associated with a defined account for the primary ACEI 405 and may interact with the primary ACEI 405 in relation to development, deployment and maintenance of cloud applications. In one embodiment, the repository 409 stores account data of the account. The account data may include data associated with details for the defined accounts as disclosed above and metadata associated with the stored data for the account at the primary ACEI 405 running in the primary data center 403. The account data stored in the repository 409 represents a bundle of account information that is generated in the primary ACEI 405.

In one embodiment, the account may be subscribed to premium disaster recovery (DR). When the account is subscribed to the premium DR, the account data and application data of the applications associated with the account are replicated to the secondary ACEI 419. Thus, in case of a disaster at a location where the primary data center 403 is positioned, the account data and the application data can be recovered at the secondary ACEI 419 with minimal data losses and within a short interval of time. The subscription to the premium DR may be defined by configuring a parameter in the metadata from the account data (e.g., the account data 112 of FIG. 1) for an account at the primary ACEI 405. The metadata for the account is part of the account data stored in the repository 409.

Further, upon subscription, one or more primary application instances that are associated with the account may be enabled for the premium DR through defining a configuration of the one or more primary application instances at the primary ACEI 405.

In one embodiment, a number of premium DR application (app) instances 413 run in the primary ACEI 405. The premium DR application instances 413 may be defined for an account which is subscribed for the premium DR service and a configuration for the premium DR app instances 413 is defined at the primary ACEI 405, for example such configuration details may be set at the account data stored at the repository 409. Alternatively, the configuration details may be stored in a persistent storage associated with a DR service of the primary ACEI 405. The number of premium DR app instances 413 is associated with one or more accounts subscribed to the premium DR.

In one embodiment, the number of premium DR app instances 413 is associated with a corresponding number of databases 414. The number of premium DR app instances 413 persist application data in the number of databases 414. A premium DR app instance from the number of premium DR app instances 413 is associated with a corresponding database from the databases 414. In one embodiment, database replication is enabled for the number of premium DR app instances 413. Thus, application data persisted by the premium DR app instance in the corresponding database of the databases 414 is automatically replicated in databases 426. For example, database transactions in the databases 414 may be captured and replicated the databases 426. In one embodiment, the number of premium DR app instances 413 includes the one or more primary application instances associated with the account.

In addition, the primary data center 403 includes global traffic management (GTM) 404, according to one embodiment. The GTM 404 can be described as a domain name system (DNS) that stores network addresses (e.g., uniform resource locator (URL) addresses) of primary application instances running in the primary ACEI 405. For example, the GTM 404 may store URL addresses of the premium DR app instances 413. The secondary data center 417 hosts secondary ACEI 419 and further includes GTM 416. The GTM 416 is a DNS that stores URL addresses of secondary application instances running in the secondary ACEI 419.

The secondary data center 417 represents a backup data center for the primary data center 403, according to one embodiment. The secondary ACEI 419 can be viewed as a backup active cloud environment instance of the primary ACEI 405 that may be used as a substitute instance when the primary ACEI 405 is unavailable due to a disaster at a location associated with the primary data center 403.

In one embodiment, the GTM 404 and the GTM 416 are clustered together and exchange messages directly. For example, the GTM 404 and the GTM 416 may exchange messages that include URL addresses of application instances running in the primary ACEI 405 (e.g., primary application instances) and URL addresses of application instances running in the secondary ACEI 419 (e.g., secondary application instances). Thus, the GTM 404 and the GTM 416 store URL addresses of primary application instances and secondary application instances. The GTM 404 and the GTM 416 manage network traffic to and from the primary data center 403 and the secondary data center 417, respectively. The GMT 404 and the GTM 416 may redirect the network traffic from the primary data center 403 to the secondary data center 417 and vice versa if necessary (e.g., in case of a disaster). Moreover, network traffic to a specific application instance running in the primary ACEI 405 can be redirected to a corresponding application instance running in the secondary ACEI 419, instead of redirecting the network traffic to the entire secondary data center 417.

In one embodiment, the primary ACEI 405 communicates with the GTM 404 via a corresponding GTM service 406 of the primary ACEI 405. The GTM service 406 is a dedicated service that provides a mechanism for configuration and management of GTM 404. For example, a representational state transfer (REST) application programming interface (API) for accessing the GMT 404 may be provided by the GTM service 406. Similarly, the secondary ACEI 419 includes GTM service 418. The secondary ACEI 419 communicates with the GTM 416 via the GTM service 418.

In one embodiment, one or more instances of a disaster recovery (DR) service reside on the primary ACEI 405 and on the secondary ACEI 419. The primary ACEI 405 includes disaster recovery (DR) service 407 instance. The secondary ACEI 419 includes DR service 420 instance. The DR service is a centralized service for DR configuration and management. Replication of account data and application data can be configured via the DR service. In one embodiment, the DR service configures replication of the account subscribed to the premium DR from the primary ACEI 405 to the secondary ACEI 419. In the primary ACEI 405, the DR service 407 sends a request to replication service 410 to export the account data of the premium DR account from the repository 409 (e.g., in accordance with process 200 described above with reference to FIG. 2).

In one embodiment, the replication service 410 exports the account data, encrypts the account data in a message, and sends the message to messaging service 412. The messaging service 412 is connected to messaging service 424 of the secondary ACEI 419. In one embodiment, the messaging service 412 sends the message to the messaging service 424. In the secondary ACEI 419, the DR service 420 sends a request to replication service 422 to import the account data of the account to the repository 421 (e.g., in accordance with process 300 described above with reference to FIG. 3). In one embodiment, the replication service 422 polls the messaging service 424 for messages, reads and decrypts the message to extract the account data, and imports the account data to the repository 421 of the secondary ACEI 419.

Further, the DR service orchestrates a number of DR specific tasks to enable the replication of the account data and the application data. In one embodiment, the DR service triggers redirection of the network traffic to the secondary data center 417 in case of a disaster at a location where the primary data center 403 is positioned, adjusts the account metadata to specify the account as subscribed to the premium DR, triggers installation of databases when necessary, configures the replication of the account data and the application data, triggers database takeover, etc. In one embodiment, the DR service 407 specifies an account as subscribed to the premium DR by adding a parameter in metadata of the account that is part of the account data.

In one embodiment, URLs of the number of premium DR app instances 413 are configured in the GTM 404 and the GTM 416, when the replication is enabled for the number of premium DR app instances 413. The URLs can be configured through the DR service 407 or the DR service 420. Configuration includes specifying a URL for accessing a premium DR app instance of the number of premium DR app instances 413 in the primary ACEI 405 and a URL for accessing a corresponding premium DR app instance from the premium DR app instances 427 in the secondary ACEI 419. In one embodiment, the DR service 407 transfers the URLs configuration to the GTM 404 via the GTM service 406. For example, the DR service 407 makes a REST call to the GTM service 406 and passes the URLs as parameters.

In one embodiment, the replication of the one or more primary application instances associated with the account is enabled by sending a request to the DR service 407. In one embodiment, the request to enable the one or more application instances for the premium DR is sent from an administrative user interface (UI) (not illustrated) accessed by support 401 staff of the primary ACEI 405. It would be appreciated, however, that the request to enable the one or more application instances for the premium DR may be sent by the user 402. For example, the user 402 may access cockpit 408 or cockpit 423 and send the request. In one embodiment, the cockpit 408 (as well as the cockpit 423) is a web-based interface that provides the user 402 with access to a number of functions for configuring, monitoring and managing the one or more application instances, the account of user 402, and services such as the DR service. The one or more primary application instances with enabled replication of corresponding application databases from databases 414 can be referred to as premium DR app instances.

In one embodiment, the databases 414 in the primary ACEI 405 are replicated to the databases 426 in the secondary ACEI 419. The databases 426 are installed in the secondary ACEI 419 when the premium DR is enabled for a number of premium DR app instances associated with the databases 414. To install a database of the databases 426 in secondary ACEI 419, the DR service 420 sends a request to DB admin 425, DB admin service instances run in the primary ACEI 405 (DB admin 411) and in the secondary ACEI 419 (DB admin 425). The DB admin service instances in the primary ACEI 405 and in the secondary ACEI 419 are configured to monitor, install and administrate databases in the cloud environment instances. In one embodiment, the DB admin services 411 and 425 access the databases 414 and 426 through different mechanisms including, but no limited to, SQL Server® access and hypertext transfer protocol secure (HTTPS) access via a REST application programming interface (API) to provision, install or update the databases. The DB admin 411 is configured to start the replication of the databases 414 to the databases 426, when the secondary database is installed in the secondary ACEI 419.

In one embodiment, the DB admin 425 is configured to perform a database takeover to the databases 426 when operation of the primary ACEI 405 is interrupted. For example, the DR service 420 may request the database takeover by calling a REST API of the DB admin 425 with parameters specifying one or more databases of databases 426 for the takeover.

Figure 5:
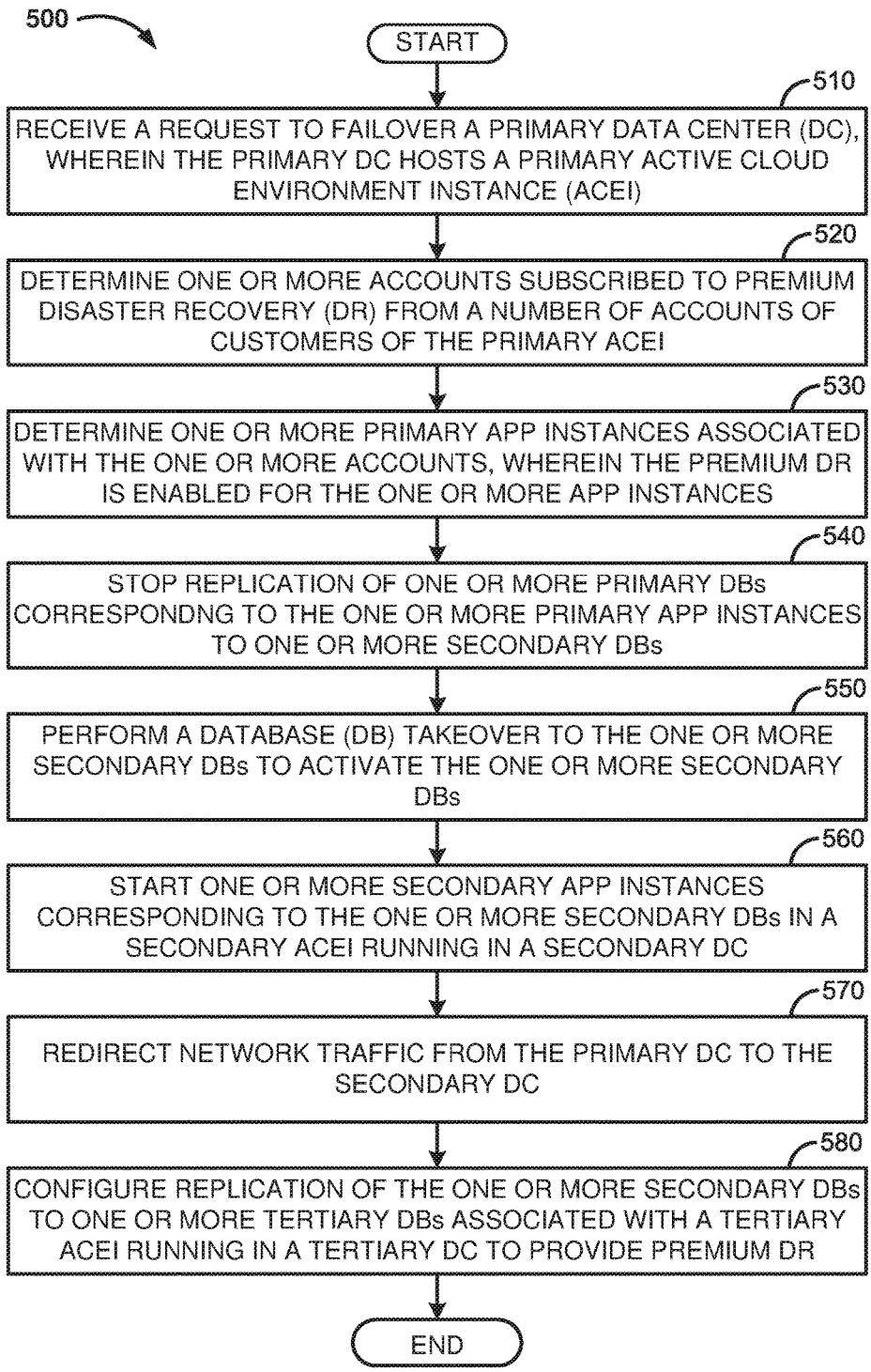
FIG. 5 is a flow diagram illustrating a process to failover a primary ACEI of a primary data center to a secondary data center, according to one embodiment.

FIG. 5 illustrates a process 500 to failover a primary data center to a secondary data center, according to one embodiment. The primary data center hosts a primary ACEI. A failover of the primary data center may be required when a disaster causes significant damage to or destroys the primary data center and thus, interrupts operation of the primary ACEI. In such cases, switching to the secondary (backup) data center is performed to recover data associated with the primary ACEI and to provide continuous operation of the primary ACEI. At 510, a request to failover the primary data center is received. In one embodiment, the failover request is received at a disaster recovery (DR) service of a secondary ACEI that is hosted at the secondary data center. For example, the failover request may be received at the DR service 420 of system 400, FIG. 4.

At 520, one or more accounts from a number of accounts defined at the primary ACEI are determined. The one or more accounts may be associated with a number of customers of the primary ACEI. For the one or more accounts, a premium disaster recovery procedure may be enabled. A subscription to the premium disaster recovery may be enabled through a configuration performed for the account at the primary ACEI and updating of the account data stored for the account at the primary ACEI. In one embodiment, the account data of the number of accounts is checked to determine whether an account from the one or more accounts is subscribed to the premium DR. For example, a parameter at the account data may be set to "premium" for accounts subscribed to the premium DR. At 530, one or more primary application instances associated with the one or more accounts are determined.

In one embodiment, an account subscribed to the premium DR may be associated with application instances with enabled premium DR as well as with application instances with disabled premium DR. In one embodiment, a user (e.g., user 402 of FIG. 4) associated with the account enables the premium DR for the one or more primary application instances. Thus, the user configures application instance associated with the account to be provided with the premium DR service. It should be appreciated, however, that the premium DR may be enabled by administrator or support personnel such as support 401, FIG. 4.

In one embodiment, during the replication of the one or more primary DBs to the one or more secondary DBs, the one or more secondary DBs operate in read-only mode. That is, data in the one or more secondary DBs cannot be edited and new data cannot be included. At 540, replication of one or more primary databases (DBs) corresponding to the one or more primary application instances is terminated. The one or more primary DBs are replicated to one or more secondary DBs in the secondary data center. When the replication of the one or more primary DBs is terminated, at 550, a DB takeover to the one or more secondary DBs is performed. By performing the takeover, the one or more secondary DBs become operational and data in the one or more secondary DBs can be edited and/or new data may be included. In one embodiment, steps 540 and 550 of process 500 are performed by a DB admin service of the secondary ACEI (e.g., the DB admin 425 of system 400 described above with reference to FIG. 4).

Upon the DB takeover to the one or more secondary DBs, at 560, one or more secondary application instances are started in the secondary ACEI. In one embodiment, at least one application is instantiated to start the one or more secondary application instances. The at least one application may be deployed in the secondary ACEI prior to execution of process 500 to enable the instantiation of the one or more secondary application instances. The one or more secondary application instances are associated with the one or more secondary DBs, and correspond to the one or more primary application instances. At 570, network traffic is redirected from the primary data center to the secondary data center. For example, DR service 420 may send a redirect request through GTM service 418 to GTM device 416. The redirected network traffic provides redirection of requests, that are originally directed to a primary app instance, to a corresponding secondary app instance at the secondary ACEI.

At 580, replication of the one or more secondary DBs to one or more tertiary DBs is configured. Replication of the one or more secondary DBs to the one or more tertiary DBs is necessary to enable continuous provision of the premium DR level for subscribed accounts when a disaster happens. In one embodiment, the one or more tertiary DBs are associated with a tertiary ACEI running in a tertiary data center, remotely positioned from the secondary data center. The tertiary ACEI may represent a backup ACEI to the secondary ACEI in case of a disaster. Account data and application data may be replicated from the secondary ACEI to the tertiary ACEI, where the account data and the application data may be restored, as disclosed above, in case of another disaster that damages or destroys a location where the secondary data center is positioned.

Figure 6A:
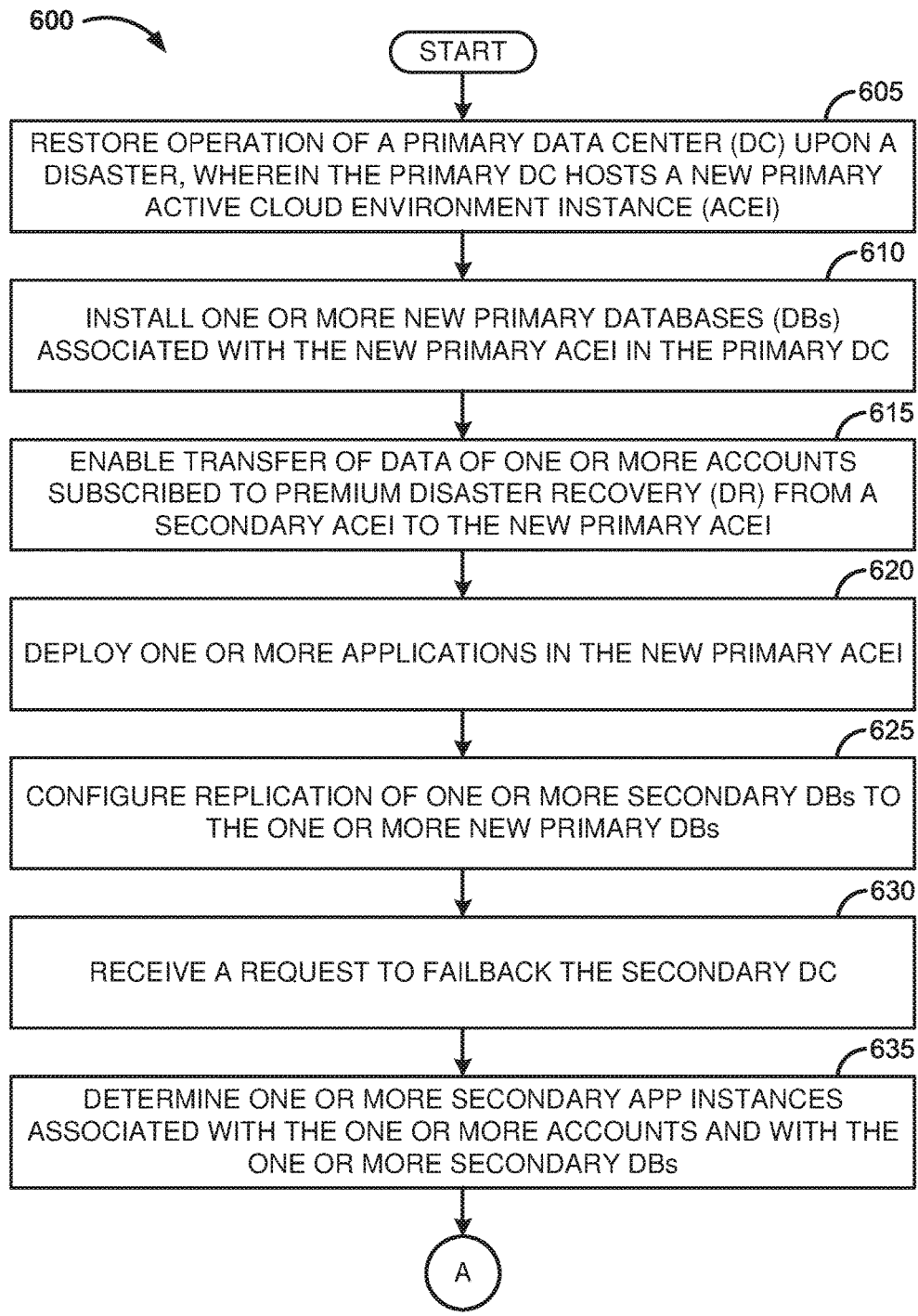
FIGS. 6A-6B are flow diagrams illustrating a process to failback a secondary data center to a primary data center, according to one embodiment.
Figure 6B:
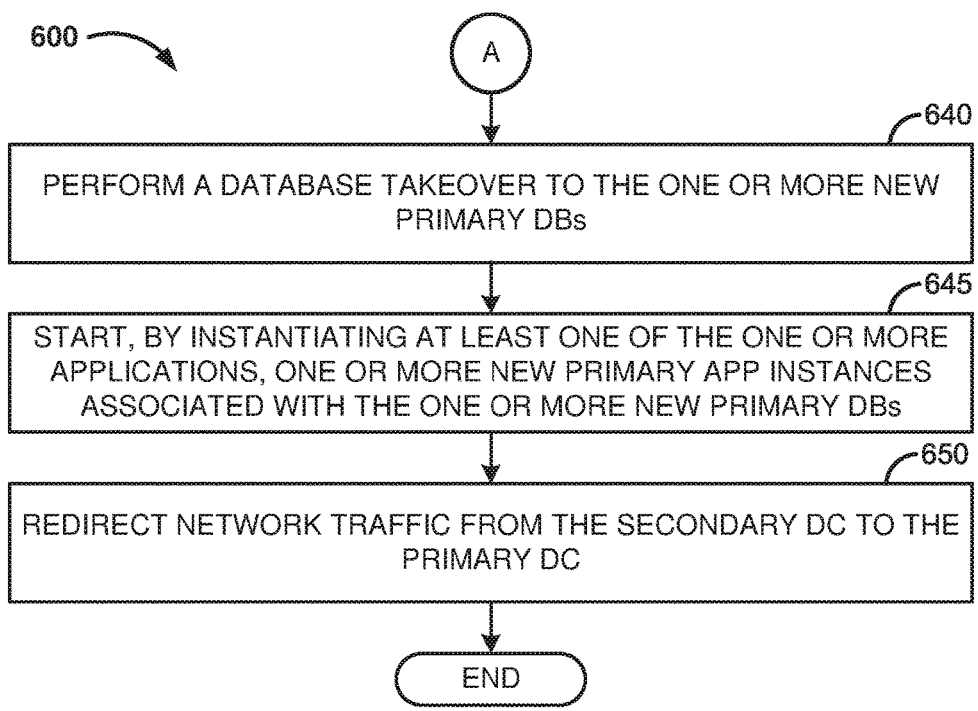

FIGS. 6A and 6B illustrate a process 600 to fallback a secondary data center to a primary data center, according to one embodiment. Failback is performed to restore account data and application data to a primary data center. Due to a disaster, operation of the primary data center may have been interrupted and a failover to a secondary data center may have been performed. (e.g., in accordance with process 500 described above with reference to FIG. 5). When the disaster is not affecting the primary data center anymore, the account data and application data may failback to the primary data center. For example, the account data and the application data originating from the primary data center may be restored in the primary data center for load-balancing purposes.

At 605 (FIG. 6A), operation of the primary data center is restored. The primary data center hosts a new primary active cloud environment instance (ACEI). At 610, one or more new primary databases (DBs) are installed. The one or more new primary DBs are associated with the new primary ACEI. In one embodiment, the one or more new primary DBs may be installed by a DB admin service of the new primary ACEI upon a request from a DR service of the new primary ACEI. At 615, transfer of data of one or more accounts subscribed to premium DR is enabled. The account data to be transferred from a repository of the secondary ACEI to a repository of the new primary ACEI, according to one embodiment.

At 620, one or more applications are deployed in the new primary ACEI. At 625, replication of one or more secondary DBs to the one or more new primary DBs is configured. In one embodiment, the DR service sends a request to trigger the replication to the DB admin service. At 630, a request to failback the secondary data center is received. A failback procedure is performed to restore account data and application data in the primary data center. Upon receiving the failback request, at 635, one or more secondary application instances are determined. The one or more secondary application instances are associated with the one or more secondary DBs. In addition, the one or more secondary application instances are associated with the account subscribed to the premium DR.

At 640 (FIG. 6B), a database takeover to the one or more new primary DBs is performed. By performing the database takeover, the replication of the one or more secondary DBs to the one or more new primary DBs is terminated and the one or more new primary DBs become operational. Further, at 645, one or more new primary, application instances are started by instantiating at least one of the one or more applications deployed in the new primary ACEI. The one or more new primary application instances are associated with the one or more new primary DBs, according to one embodiment. At 650, network traffic is redirected from the secondary data center to the primary data center. For example, a request to redirect the network traffic is sent by the DR service to a GTM module of the primary data center.

Figure 7:
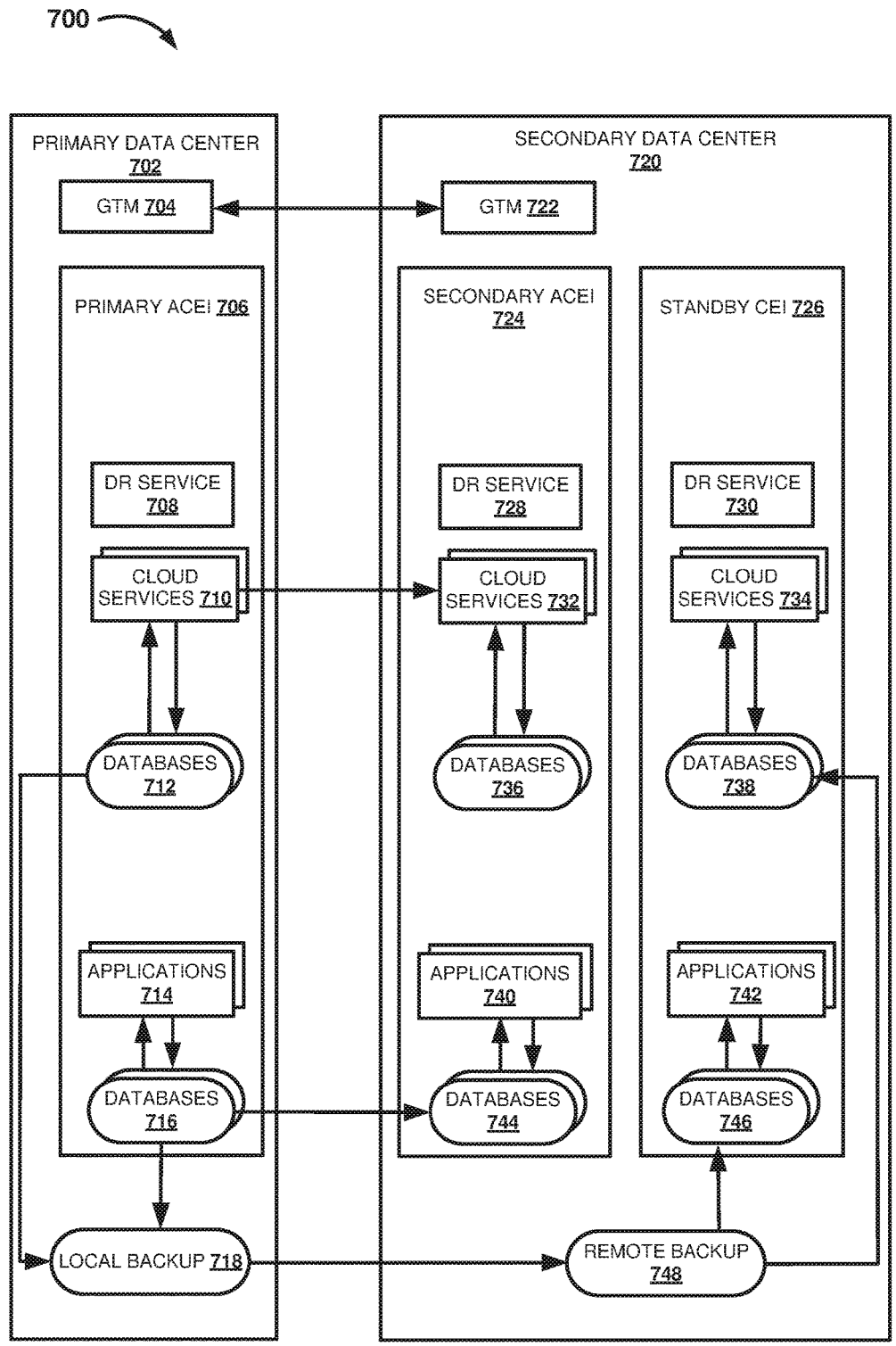
FIG. 7 is a block diagram illustrating an exemplary system to provide multiple levels of disaster recovery, according to one embodiment.

FIG. 7 illustrates a system 700 to provide multiple levels of DR to customers of a primary ACEI 706, according to one embodiment. The system 700 includes elements similar to the elements of system 100 and system 400 described above with reference to FIG. 1 and FIG. 4. The system 700 includes primary data center 702 and secondary data center 720. The secondary data center 720 represents a backup data center for the primary data center 702. The primary data center 702 includes GTM module 704 and the secondary data center 720 includes GTM module 722. The GTM 704 and the GTM 722 are clustered together to manage network traffic and communication between the primary data center 702 and the secondary data center 720.

In one embodiment, the primary ACEI 706 provides services to customers that have accounts associated with the primary ACEI 706. A DR service may be provided in addition to other services instantiated at the primary ACEI 706. The DR service may be provided in association with an optimization for recovery of operation of applications running at the primary ACEI 706, and with optimization of time required to provide the recovery of operations. In regards to recovery of operation, the DR service may be associated with age of data that has been backed up and may be recovered in case of a disaster and with a maximum length of time that applications 714 of the primary ACEI 706 may be unavailable. Based on the age of the data, a minimum frequency (time interval for backing up) may be determined in which the data in the primary ACEI 706 should be copied. The age of the data is a measure of a maximum time interval in which data might be lost if there is a disaster affecting operation of the primary ACEI 706. The frequency of backing up the data corresponds to this maximum period in which created data may be lost. Therefore, by defining the age of the data, the customers define a maximum time interval for backing up the data. For example, when a customer requests to be able to restore data created 5 minutes ago, the age of the data is defined to be "5 minutes". Therefore, in case of a disaster, data created 5 minutes (or more) ago may be restored, while data created 4 minutes (or less) ago may not be restored and may be lost. On this basis, the minimum frequency of backing up the data may be set to "5 minutes".

In one embodiment, a standard DR level and a premium DR level are provided to the customers of the primary ACEI 706. The premium DR level provides smaller value of the measurement for the age of data recovered and shorter length of time customer applications are unavailable compared to the standard DR. Therefore, the premium DR provides shorter applications' downtime and smaller age of recovered data for customers of the primary ACEI 706.

In one embodiment, the premium DR is based on database replication and transfer of account data to the secondary ACEI 724 hosted by the secondary data center 720. The database replication and the transfer of the account data are configured and managed by DR services residing on the primary ACEI 706 (e.g., DR service 708) and on the secondary ACEI 724 (e.g., DR service 728). When the premium DR is enabled for an application of applications 714, replication of a database associated with the application from the databases 716 is enabled. The database associated with the application is replicated to a corresponding database of the databases 744. The corresponding database is associated with an application of applications 740 in the secondary ACEI 724. Applications 740 correspond to applications 714. Further, transfer of the account data from persistent storages associated with cloud services 710 (e.g., databases 712) to persistent storages associated with cloud services 732 (e.g., databases 736) is triggered. The account data corresponds to an account of a primary ACEI 706 customer that is subscribed to the premium DR. The transfer of the account data and the replication of application data of an application associated with the premium DR account are described in detail above with reference to systems 100 and 400 and processes 200 and 300.

In one embodiment, the system 700 includes standby cloud environment instance (CEI) 726, in addition to the primary ACEI 706 and the secondary ACEI 724. The standby CEI 726 shares hardware resources provided by the secondary data center 720 with the secondary ACEI 724. The standby CEI 726 is configured to correspond to a configuration defined at the primary ACEI 706. The standby CEI 726 includes cloud services 734, databases 738 associated with the cloud services 734, applications 742, and databases 746 associated with the applications 742.

The cloud services 734 of the standby CEI 726 correspond to the cloud services 710 of the primary ACEI 706. Further, the databases 738 correspond to the databases 712. For example, the cloud services 710 provided by the primary ACEI 706 may include a connectivity service, a document service, and an identity service. The connectivity service, the document service, and the identity service of the primary ACEI 706 persist data including account data in corresponding connectivity service database, document service database, and identity service database of the databases 712. Similarly, the cloud services 734 include a connectivity service, a document service, and an identity service. In addition, the databases 738 include a connectivity service database, a document service database, and an identity service database where the connectivity, service, the document service, and the identity service of the standby CEI 726 persist the account data.

In one embodiment, the standby CEI 726 runs in a "prepared" mode. Although configured in accordance with the primary ACEI 702 and prepared to provide similar services to the customers of the primary ACEI 702, the cloud services 734 of the standby CEI 726 do not process data. Respectively, the cloud services 734 do not store account data in the databases 738. Thus, the standby CEI 726 consumes limited amount of resources provided by the secondary data center 720. In one embodiment, the functionality provided by the standby CEI 726 is utilized in case of a disaster.

In one embodiment, the standard DR level is based on database backups. When an application of the applications 714 is associated with the standard DR level, the databases 712 associated with the cloud services 710 and the databases 716 associated with the applications 714 are backed up in the local backup 718, according to one embodiment. The local backup 718 includes a backup copy of application data stored in the databases 716 by one or more primary application instances associated with the standard DR. In addition, the local backup 718 includes a backup copy of account data corresponding to standard DR accounts and stored in the databases 712 by the cloud services 710, according to one embodiment. When created, the local backup 718 is copied to remote backup 748 that is stored in the secondary data center 720, according to one embodiment.

In one embodiment, upon a disaster at a location where the primary data center 702 is positioned, the account data and the application data of the number of customers of the primary ACEI 706 running in the primary data center 702 are restored in the secondary ACEI 724 and in the standby CEI 726 running in the secondary data center 720. Application data of primary application instances enabled for the premium DR and account data of corresponding accounts are restored in the secondary ACEI 724 based on the replicated copies of the databases 744 and the account data of the cloud services 732. Application data of primary application instances associated with the standard DR and account data of corresponding accounts are restored in the standby CEI 726 from the remote backup 748.

Figure 8:
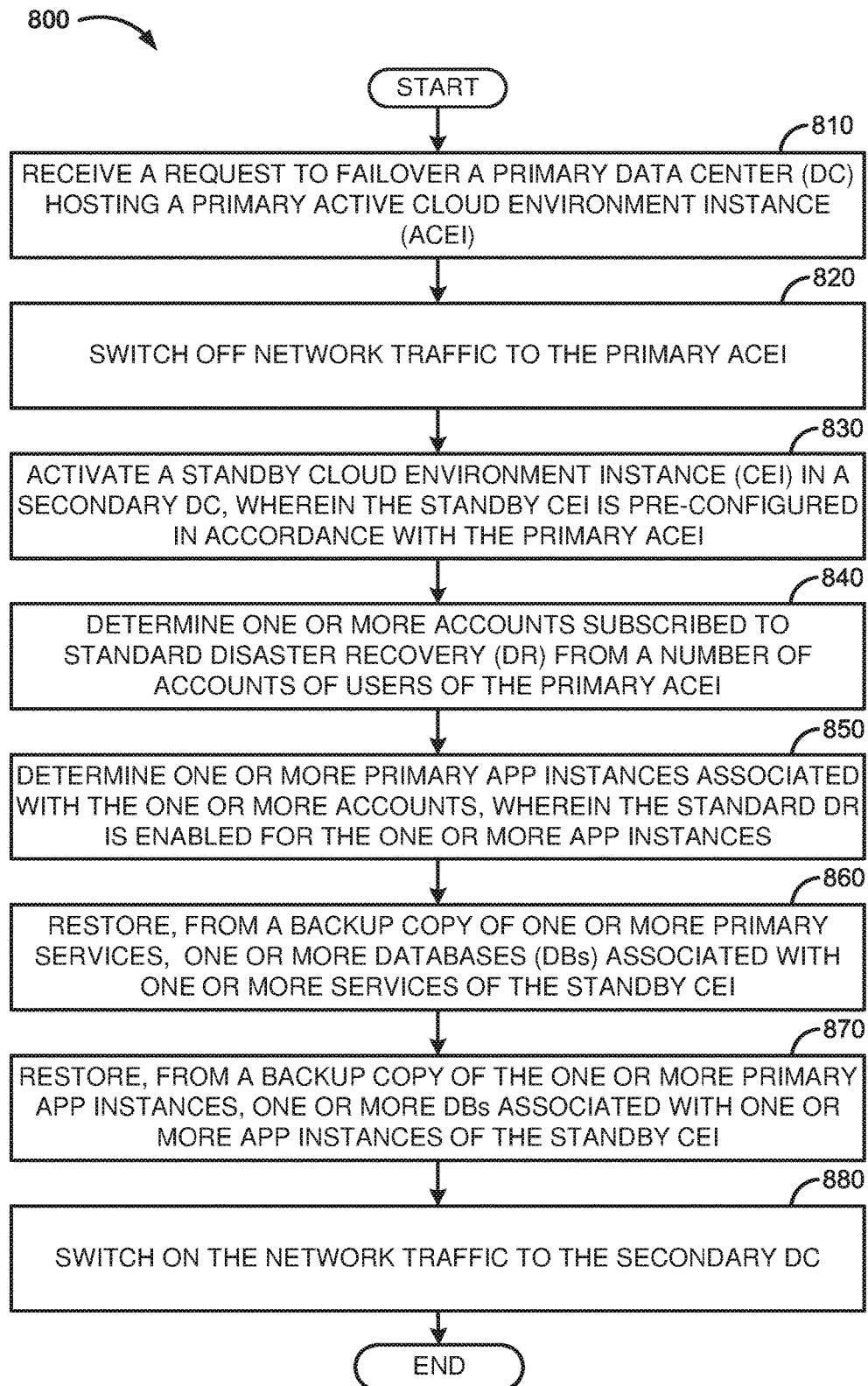
FIG. 8 is a flow diagram illustrating a process to failover a primary ACEI of a primary data center to a standby cloud environment instance (CEI) of secondary data center, according to one embodiment.

FIG. 8 illustrates a process 800 to failover a primary ACEI, according to one embodiment. A primary data center hosts the primary ACEI. In case of a failover, switching to a secondary data center is performed to recover data stored at the primary data center in relation to the primary ACEI. In one embodiment, a standard DR level and a premium DR level are provided to the customers of the primary ACEI. Process 800 includes failover steps performed for accounts of the primary ACEI, for which the standard DR level is configured for the recovery of operations for applications running at the primary ACEI.

At 810, a request to failover the primary data center is received. In one embodiment, the failover request is received at a disaster recovery (DR) service instantiated at a standby CEI running at the secondary data center. For example, the failover request may be received at the DR service 730 of system 700, FIG. 7. At 820, network traffic to the primary ACEI is switched off. For example, DR service 730 may send a request to switch off the network traffic to GTM 722. In one embodiment, the standby CEI is pre-configured in accordance with the primary ACEI. For example, cloud services instantiated in the primary ACEI are instantiated in the standby CEI as well. The pre-configuration may be performed manually, e.g., by an administrator of the system that selects one or more cloud services to be instantiated. At 830, the standby CEI is activated. That is, cloud services of the standby CEI start processing data and persist customer account data in corresponding databases. Upon activation of the standby CEI, at 840, one or more accounts from a number of accounts of customers of the primary ACEI are determined. The one or more accounts are subscribed to the standard DR level, according to one embodiment. The one or more accounts are associated with one or more primary application instances for which the standard DR is enabled. At 850, the one or more primary application instances with enabled standard DR are determined.

At 860, one or more databases associated with one or more cloud services are restored. The one or more databases are restored from a backup copy of one or more databases associated with one or more corresponding cloud services provided by the primary ACEI. The backup copy is stored in the secondary data center. The backup copy is transferred from the primary data center to the secondary data center. Next, at 870, one or more databases associated with the one or more application instances are restored. The one or more databases are restored from a backup copy of one or more databases associated with one or more corresponding primary application instances running in the primary ACEI. At 880, the network traffic to the secondary data center is switched on.

Figure 9:
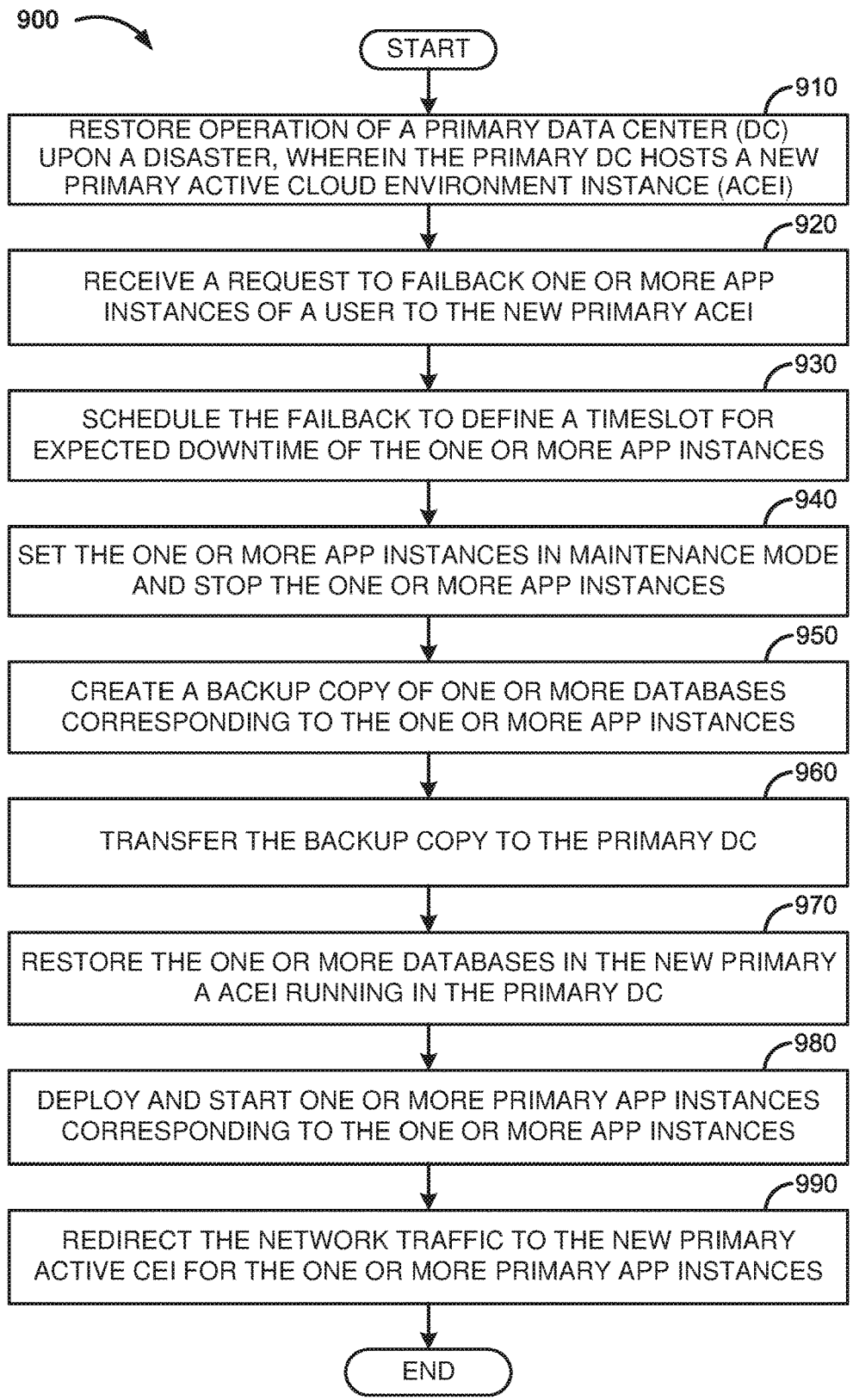
FIG. 9 is a flow diagram illustrating a process to failback one or more application instances to a primary data center, according to one embodiment.

FIG. 9 illustrates a process 900 to fallback one or more application instances to a primary data center, according to one embodiment. At 910, operation of the primary data center is restored after a period of unavailability. In one embodiment, a new primary ACEI is hosted at the primary data center. At 920, a request is received to fallback one or more application instances of a primary ACEI account to the new primary ACEI.

In one embodiment, the one or more application instances are enabled for standard disaster recovery (DR) and run in a standby CEI such as standby CEI 726 of system 700 described above with reference to FIG. 7. At 930, a timeslot for an expected downtime is defined by scheduling the fallback. During the scheduled timeslot, at 940, the one or more application instances are set in maintenance mode and stopped. At 950, a backup copy of one or more databases is created. The one or more databases correspond to the one or more application instances. Upon creation, at 960, the backup copy is transferred from the secondary data center to the primary data center. Next, at 970, the one or more databases are restored in the new primary ACEI from the backup copy. At 980, one or more primary application instances are deployed and started in the new primary ACEI. The one or more primary application instances correspond to the one or more application instances.

At 990, network traffic to the one or more primary application instances is redirected from the secondary data center to the primary data center. Further, the one or more application instances running in the standby CEI may be terminated.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
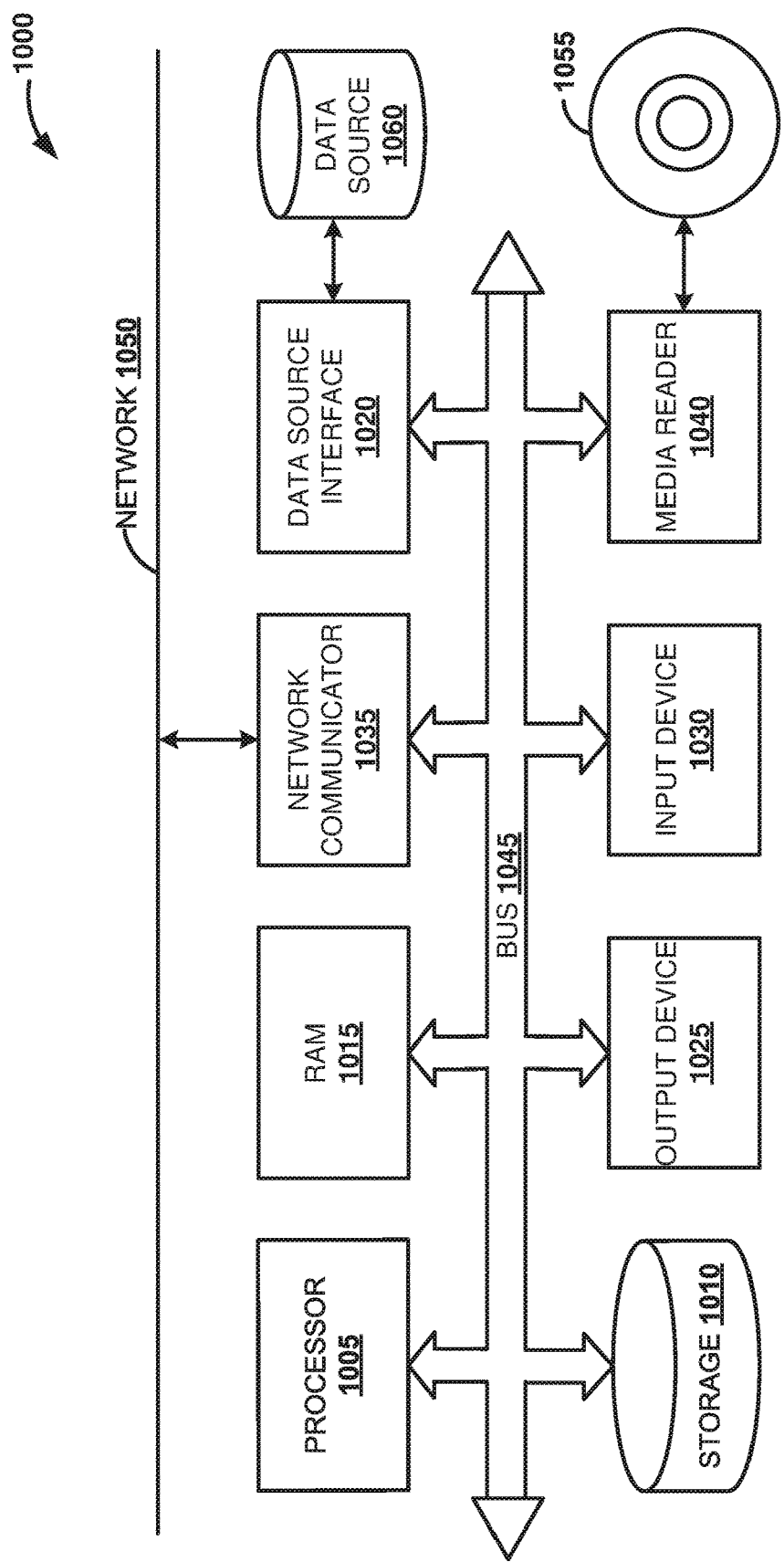
FIG. 10 is a block diagram of an exemplary computer system, according to one embodiment.

FIG. 10 is a block diagram of an exemplary computer system 1000. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, all of the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to recover data upon a disaster, the method comprising:
   receiving account data of an account at a secondary active cloud environment instance (ACEI) hosted at a secondary data center, wherein the account data comprises metadata for one or more primary application instances of a plurality of primary application instances running at a primary ACEI hosted at a primary data center, wherein the account is associated with the primary ACEI and the secondary ACEI;
   receiving, at one or more secondary databases (DBs) of the secondary ACEI, application data associated with the one or more primary application instances from the primary ACEI;

receiving a request at the secondary data center to failover the primary data center;

performing a database (DB) takeover to the one or more secondary DBs;

starting, in the secondary ACEI, one or more secondary application instances corresponding to the one or more primary application instances, wherein the one or more secondary application instances are configured based on the account data, and wherein the one or more secondary application instances are associated with the one or more secondary DBs; and receiving a redirected request to a primary application instance of the one or more primary application instances at a corresponding application instance of the one or more secondary application instances.

2. The method of claim 1, further comprising:

upon performing the DB takeover, configuring transfer of the account data from the secondary ACEI to a tertiary ACEI hosted at a tertiary data center, wherein the account data comprises metadata for the one or more secondary application instances; and configuring replication of the one or more secondary DBs to one or more tertiary DBs associated with the tertiary ACEI, wherein the one or more tertiary DBs are associated with one or more tertiary application instances running at the tertiary ACEI.

3. The method of claim 1, wherein the application data is associated with implemented functionality at the one or more primary application instances and with a cloud service provided at the primary ACEI, wherein the cloud service is consumed by at least one of the one or more primary application instances, and wherein the account data defines at least one relationship between the cloud service and the at least one of the one or more primary application instances.

4. The method of claim 1, further comprising:

at the primary ACEI:

polling a repository of the primary ACEI for changes in the account data, wherein the account data is persisted at the repository;

when the account data includes changes, exporting a portion of the account data to a replication service of the primary ACEI, wherein the portion of the account data includes the changes;

encrypting the exported portion of the account data in a message;

sending the message to a messaging service of the primary ACEI; and transferring the message from the messaging service of the primary ACEI to a messaging service of a secondary ACEI.

5. The method of claim 1, further comprising:

polling a messaging service of the secondary ACE for messages comprising the account data, wherein the account data is exported from a repository of the primary ACEI;

when a message is in the messaging service of the secondary ACEI, reading the message;

deleting the message from the messaging service of the secondary ACEI;

decrypting the message to extract the account data; and importing the account data to a repository of the secondary ACEI.

6. The method of claim 1, further comprising:

determining premium disaster recovery (DR) is enabled for the one or more primary application instances; and triggering replication of one or more primary DBs associated with the one or more primary application instances to the one or more secondary DBs, wherein the one or more primary application instances persist the application data in the one or more primary DBs.

7. The method of claim 6, further comprising:

upon receiving the request to failover the primary data center, determining at least one primary application instance associated with the account of the plurality of primary application instances, wherein a standard DR is enabled for the at least one primary application instance;

terminating network traffic to the at least one primary application instance running at the primary ACEI;

activating a standby cloud environment instance (CEI) in the secondary data center, wherein the standby CEI is pre-configured in accordance with a configuration of the primary ACEI;

restoring one or more databases associated with one or more services at the standby CEI, based on a backup copy of one or more primary databases associated with one or more primary services, wherein the backup copy is stored at the second data center; and restoring at least one database associated with at least one application instance at the standby CEI based on a backup copy of at least one primary database associated with the at least one primary application instance, wherein the at least one application instance corresponds to the at least one primary application instance.

8. A computer system to prevent data loss, the system comprising:

a processor;

a memory in association with the processor storing instructions related to:

instantiating a primary disaster recovery (DR) interface at a primary active cloud environment instance (ACEI) to enable replication of account data and one or more primary application databases associated with one or more primary application instances running in the primary ACEI, wherein the primary DR interface is configured to:

export the account data associated with a plurality of premium DR accounts defined in the primary ACEI to a messaging service of the primary ACEI; and trigger replication of the one or more primary application databases to one or more secondary application databases in a secondary ACEI, wherein the primary ACEI runs in a primary data center, and wherein the one or more primary application instances are associated with the plurality of premium DR accounts; and instantiating a secondary DR interface at the secondary ACEI to enable failover of the primary data center, wherein the secondary DR interface is configured to:

import the account data from a messaging service of the secondary ACEI, wherein the secondary ACEI runs in a secondary data center; and trigger a database takeover to the one or more secondary application databases, wherein the one or more secondary application databases are associated with one or more secondary application instances corresponding to the one or more primary application instances.

9. The system of claim 8 further storing instructions related to:

instantiating a standby DR interface in a standby cloud environment instance (CEI) of the secondary data center, wherein the standby DR interface is configured to:

restore, from a backup copy created at the primary data center and transported to the secondary data center, account data associated with a plurality of standard DR accounts defined in the primary ACEI;

restore application data from one or more primary application databases of one or more primary application instances associated with the plurality of standard DR accounts; and redirect network traffic to the standby CEI.

10. The system of claim 8, wherein the primary DR interface is further configured to:

change a parameter in metadata of an account of the plurality of premium DR accounts to define the account as premium DR account, wherein the account data comprises the metadata of the account;

send a request to a primary replication service of the primary ACEI to export the account data from a repository of the primary ACEI to the messaging service of the primary ACEI; and send a request to a database admin service of the primary ACEI to enable replication of the one or more primary application databases.

11. The system of claim 10, wherein the primary replication service is further operable to;

poll the repository of the primary ACEI for changes in the account data; and encrypt the account data to a message and sends the message to the messaging service of the primary ACEI.

12. The system of claim 8, wherein secondary DR interface is further configured to:

send a request to a database admin service of the secondary ACEI to stop replication of the one or more primary application databases to the one or more secondary application;

send a request to the database admin service of the secondary ACEI to perform the database takeover from the one or more primary application databases to the one or more secondary application databases;

start the one or more secondary application instances in the secondary ACEI, wherein the one or more secondary application instances are associated with the one or more secondary application databases and with the plurality of premium DR accounts; and send a request to a global traffic management (GTM) service of the secondary ACEI to redirect network traffic from the primary data center to the secondary data center.

13. The system of claim 12, wherein the secondary replication service is further operable to:

upon receiving a request from the secondary DR interface, read one or more messages comprising the account data from the messaging service of the secondary ACEI;

decrypt the one or more messages to extract the account data; and import the account data in a repository of the secondary ACEI.

14. A non-transitory computer readable medium storing instructions which when executed by at least processor cause a computer system to perform operations comprising:

receive account data of an account at a secondary active cloud environment instance (ACEI) hosted at a secondary data center, wherein the account data comprises metadata for one or more primary application instances of a plurality of primary application instances running at a primary ACEI hosted at a primary data center, wherein the account is associated with the primary ACEI and the secondary ACEI;

receive, at one or more secondary databases (DBs) of the secondary ACEI, application data associated with the one or more primary application instances from the primary ACEI;

receive a request at the secondary data center to failover the primary data center;

perform a database (DB) takeover to the one or more secondary DBs;

start, in the secondary ACEI, one or more secondary application instances corresponding to the one or more primary application instances, wherein the one or more secondary application instances are configured based on the account data, and wherein the one or more secondary application instances are associated with the one or more secondary DBs; and receive a redirected request to a primary application instance of the one or more primary application instances at a corresponding application instance of the one or more secondary application instances.

15. The computer readable medium of claim 14 further storing instructions to;

upon performing the DB takeover, configure transfer of the account data from the secondary ACEI to a tertiary ACEI hosted at a tertiary data center, wherein the account data comprises metadata for the one or more secondary application instances; and configure replication of the one or more secondary DBs to one or more tertiary DBs associated with the tertiary ACEI, wherein the one or more tertiary DBs are associated with one or more tertiary application instances running at the tertiary ACEI.

16. The computer readable medium of claim 14, wherein the application data is associated with implemented functionality at the one or more primary application instances and with a cloud service provided at the primary ACEI, wherein the cloud service is consumed by at least one of the one or more primary application instances, and wherein the account data defines at least one relationship between the cloud service and the at least one of the one or more primary application instances.

17. The computer readable medium of claim 14 further storing instructions to:

at the primary ACEI:

poll a repository of the primary ACEI for changes in the account data, wherein the account data is persisted at the repository;

when the account data includes changes, export a portion of the account data to a replication service of the primary ACEI, wherein the portion of the account data includes the changes;

encrypt the exported portion of the account data in a message;

send the message to a messaging service of the primary ACEI; and transfer the message from the messaging service of the primary ACEI to a messaging service of a secondary ACEI.

18. The computer readable medium of claim 14 further storing instructions to:

poll a messaging service of the secondary ACEI for messages comprising the account data, wherein the account data is exported from a repository of the primary ACEI;

when a message is in the messaging service of the secondary ACEI, read the message;

delete the message from the messaging service of the secondary ACEI;

decrypt the message to extract the account data; and import the account data to a repository of the secondary ACEI.

19. The computer readable medium of claim 14 further storing instructions to:

determine premium disaster recovery (DR) is enabled for the one or more primary application instances; and trigger replication of one or more primary DBs associated with the one or more primary application instances to the one or more secondary DBs, wherein the one or more primary application instances persist the application data in the one or more primary DBs.

20. The computer readable medium of claim 19 further storing instructions to:

upon receiving the request to failover the primary data center, determine at least one primary application instance associated with the account of the plurality of primary application instances, wherein a standard DR is enabled for the at least one primary application instance;

terminate network traffic to the at least one primary application instance running at the primary ACEI;

activate a standby cloud environment instance (CEI) in the secondary data center, wherein the standby CEI is pre-configured in accordance with a configuration of the primary ACEI;

restore one or more databases associated with one or more services at the standby CEI, based on a backup copy of one or more primary databases associated with one or more primary services, wherein the backup copy is stored at the second data center; and restore at least one database associated with at least one application instance at the standby CEI based on a backup copy of at least one primary database associated with the at least one primary application instance, wherein the at least one application instance corresponds to the at least one primary application instance.

* * * * *